United States Patent
Gotoh et al.

[11] Patent Number: 5,925,084
[45] Date of Patent: Jul. 20, 1999

[54] ATTITUDE-SUPPORTING APPARATUS MOUNTED ON VEHICLE FOR SUSTAINING ATTITUDE OF PASSENGER AND METHOD OF SUSTAINING ATTITUDE OF PASSENGER

[75] Inventors: Kazuhiko Gotoh, Toyota; Shuitsu Yamamoto, Aichi-ken; Kazuya Sasaki, Susono; Masahiro Ueda, Nagoya; Koichi Fujita, Toyota; Takuya Otsuka, Numazu, all of Japan

[73] Assignee: Toyota Jidosha Kabushiki Kaisha, Toyoto, Japan

[21] Appl. No.: 08/781,952

[22] Filed: Dec. 20, 1996

[30] Foreign Application Priority Data

Dec. 27, 1995 [JP] Japan .................................. 7-352570
Oct. 25, 1996 [JP] Japan .................................. 8-301140

[51] Int. Cl.$^6$ .............................. G06F 17/00; G06F 7/00
[52] U.S. Cl. .............................. 701/45; 701/49; 180/271; 280/728.1
[58] Field of Search ................... 701/37, 45, 49, 701/72, 46, 47; 180/271, 282; 280/728.1, 730.1, 743.1

[56] References Cited

U.S. PATENT DOCUMENTS 5,125,472  6/1992  Hara ........................................ 180/271
5,135,253  8/1992  Hirashima et al. ...................... 280/732
5,144,559  9/1992  Kamimura et al. ....................... 701/37

FOREIGN PATENT DOCUMENTS 57453       5/1980  Japan .
4303788    10/1992  Japan .
7125591     5/1995  Japan .

Primary Examiner—William A. Cuchlinski, Jr.
Assistant Examiner—Gertrude Arthur
Attorney, Agent, or Firm—Kenyon & Kenyon

[57] ABSTRACT

A rolling angular velocity sensor (30) is used to detect a roll of a vehicle. When the vehicle rolls at a predetermined or greater rolling rate and a rolling angle RA becomes equal to or greater than a predetermined upper limit value RA1, a control unit (50) gives an instruction to a high-speed control valve (46) of an attitude-sustaining air bag (22) via an input port (56) to open the high-speed control valve (46). This enables the high-pressure air to be fed into an air bag body (48) of the attitude-sustaining air bag (22), which is accordingly inflated and expanded to support the attitude of a passenger in a passenger's seat. When the acceleration in the lateral direction is not sufficiently large, when the passenger fastens a seat belt (24), or when the passenger is not seated, the attitude-sustaining air bag (22) is not activated.

11 Claims, 10 Drawing Sheets

5,925,084

ATTITUDE-SUPPORTING APPARATUS MOUNTED ON VEHICLE FOR SUSTAINING ATTITUDE OF PASSENGER AND METHOD OF SUSTAINING ATTITUDE OF PASSENGER

BACKGROUND OF THE INVENTION

1. Field of the Invention

The present invention related to an attitude-supporting apparatus mounted on a vehicle for sustaining attitude of a passenger and a method of the same. More specifically, the present invention pertains to a technique of supporting attitude of a passenger when an acceleration is applied in a lateral direction of a vehicle, for example, when the vehicle is rolling.

2. Description of the Related Art

With the object of sustaining attitude of passenger when the vehicle is turning or rolling, the form of the seat is improved and an arm-rest is provided at the vehicle door. Recently the vehicles which the air-bag is carried on are also increase from the viewpoint of the passenger protection. The conventional attitude-supporting apparatuses are, however, not specifically directed to a lateral acceleration or a lateral force applied to a passenger when the vehicle turns or rolls.

The users of automobiles are being diversified more and more. Passengers in a vehicle are often required to carry out certain actions (for example, inclining the upper half of the body or concentrating the strength on part of the body) to support the attitude against a large acceleration, for example, due to a turn or a roll. When an aged or handicapped person is seated in a vehicle, however, these attitude-sustaining actions repeated over a relatively long time period become a heavier burden to such a person.

SUMMARY OF THE INVENTION

The object of the present invention is thus to support attitude of a passenger seated in a vehicle when the vehicle receives an acceleration in a direction intersecting a running direction of the vehicle.

At least part of the object is realized by a first attitude-supporting apparatus mounted on a vehicle for sustaining attitude of a passenger. The first attitude-supporting apparatus includes: lateral acceleration detection means for measuring an acceleration applied in a lateral direction of the vehicle; and attitude-sustaining device activating means for activating an attitude-sustaining device for sustaining the attitude of the passenger when an arithmetic value calculated from the measured acceleration becomes equal to or greater than a predetermined value.

The first attitude-supporting apparatus of the present invention activates an attitude-sustaining device for sustaining the attitude of a passenger seated in a vehicle, when an arithmetic value calculated from the measured acceleration applied in a lateral direction of the vehicle reaches or exceeds a predetermined value. When the vehicle receives an acceleration in the lateral direction of the vehicle, the attitude-sustaining device is activated to hold the attitude of a passenger in a seat, thereby realizing a comfortable and safe ride of the passenger. The arithmetic value calculated from the measured acceleration may be the acceleration itself, the derivative of the acceleration, or any other arithmetic value based on the acceleration. A value obtained from the acceleration and its arithmetic value may also be used for the determination of whether or not the attitude-sustaining device is to be activated.

In accordance with one aspect, the present invention provides a second attitude-supporting apparatus mounted on a vehicle for sustaining attitude of a passenger. The second attitude-supporting apparatus includes: rolling state detection means for detecting a rolling state of the vehicle; and attitude-sustaining device activating means for activating an attitude-sustaining device for sustaining the attitude of the passenger when the rolling state of the vehicle detected by the rolling state detection means satisfies a predetermined condition.

In the second attitude-supporting apparatus of the present invention, one preferable structure measures a rolling rate that is a revolving angular velocity around a longitudinal axis of the vehicle, measures a rolling angle as the rolling state of the vehicle when the rolling rate is equal to or higher than a predetermined level, and activates the attitude-sustaining device based on the magnitude of the rolling angle. Another preferable structure measures the rolling rate and the rolling angle as the rolling state of the vehicle, and activates the attitude-sustaining device based on the relationship between the rolling rate and the rolling angle. The former structure can readily detect the rolling state, whereas the latter structure can detect the rolling state, based on which the activation of the attitude-sustaining device is determined, with a higher accuracy.

According to another preferable structure, the attitude-supporting apparatus of the present invention further includes: seating condition detecting means for determining whether or not the passenger is seated; and inactivating means for prohibiting operation of the attitude-sustaining device activating means when the result of detection by the seating condition detecting means shows that the passenger is not seated. This structure effectively prevents the attitude-sustaining device from being uselessly activated when the passenger is not in the seat.

In such attitude-supporting apparatuses of the invention, it is preferable that the attitude-sustaining device is an air bag. The air bag may have a reversible structure that allows repeated use thereof or an irreversible structure that works only in response to a large acceleration applied in the lateral direction of the vehicle.

According to one preferable aspect, the attitude-supporting apparatus further includes a restriction member disposed on a side wall member of the vehicle to be located in the vicinity of the passenger for restricting a movement of the passenger in a direction towards the side wall member. When the body of the passenger is pressed against the side wall of the vehicle by the acceleration in the lateral direction, the restriction member mounted on the side wall member restricts the movement of the passenger while the attitude-sustaining device is activated to hold the passenger steady in the seat. This structure further enhances the attitude-supporting function.

It is preferable that the restriction member has an upper portion and a lower portion, wherein the lower portion is deformed to a relatively greater extent than the upper portion when a force is applied from the inside of the vehicle towards the side wall member. Since the degree of deformation of the lower portion is relatively larger than that of the upper portion, the upper portion further supports the body of the passenger who receives a force applied in the lateral direction while the attitude-sustaining device works to hold the passenger steady in the seat. This structure further enhances the attitude-supporting function.

A variety of structures may be applicable to realize such a configuration having different degrees of deformation on its lower portion and upper portion. By way of example, the restriction member may include a plurality of component members arranged in a substantially horizontal direction inside the side wall member, wherein upper component members have a greater rigidity than that of lower component members.

It is further preferable that at least one of the upper component members is configured to an armrest.

In accordance with another aspect, the present invention further provides a third attitude-supporting apparatus, wherein a side wall member of a vehicle located in the vicinity of a passenger comprises an upper portion and a lower portion, the lower portion being deformed to a relatively greater extent than the upper portion when a force is applied from the inside of the vehicle towards the side wall member. Since the degree of deformation of the lower portion is relatively larger than that of the upper portion, the upper portion effectively supports the body of the passenger who receives a force applied in the lateral direction. This structure ensures the effective attitude-supporting function.

The present invention is also directed to a first method of sustaining attitude of a passenger seated in a vehicle. The first method includes the steps of:

preparing an attitude-sustaining device for sustaining the attitude of the passenger who is in a passenger's seat;

measuring an acceleration applied in a lateral direction of the vehicle; and activating the attitude-sustaining device when an arithmetic value calculated from the measured acceleration becomes equal to or greater than a predetermined value.

In accordance with still another aspect, the present invention provides a second method of sustaining attitude of a passenger seated in a vehicle. The second method includes the steps of:

preparing an attitude-sustaining device for sustaining the attitude of the passenger who is in a passenger's seat;

detecting a rolling state of the vehicle; and activating the attitude-sustaining device when the detected rolling state of the vehicle satisfies a predetermined condition.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
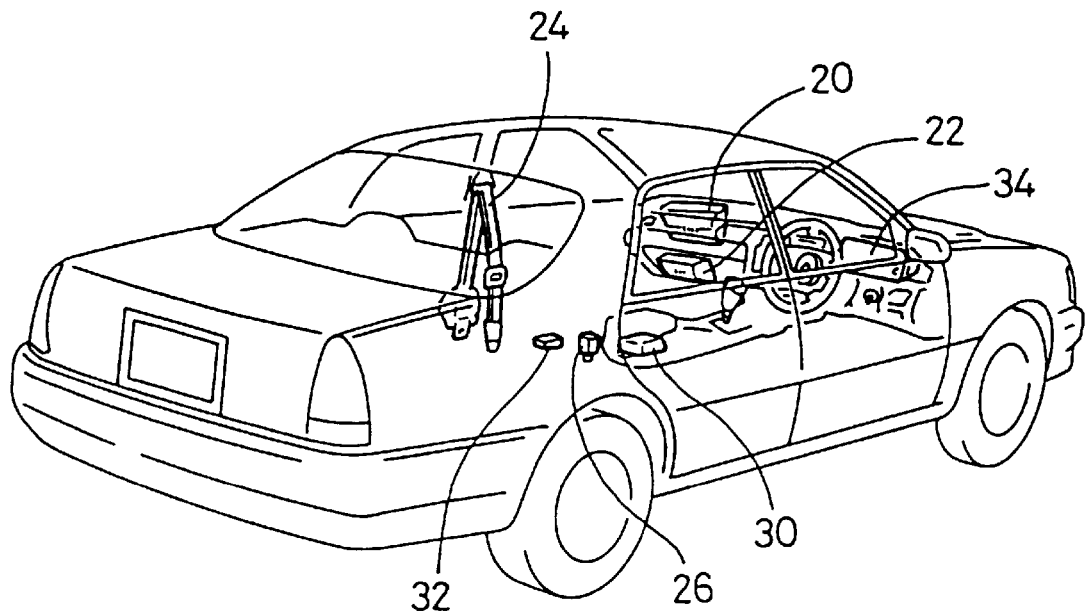
FIG. 1 is a perspective view illustrating a vehicle with an attitude-supporting apparatus incorporated therein as a first embodiment according to the present invention.

The following describes one preferable mode of carrying out the present invention as a first embodiment. Referring to FIG. 1, a normal air bag 20 for a passenger's seat as well as an attitude-sustaining air bag 22 used as an attitude-sustaining device is mounted on a vehicle. Detailed structure of the attitude-sustaining air bag 22 will be described later. The vehicle is further provided with a seat belt 24 for the passenger's seat, a seat belt sensor 26 for detecting whether or not the seat belt 24 is fastened, a rolling angular velocity sensor 30 for detecting a roll in a lateral direction of the vehicle, a seating sensor 32 for detecting whether or not a passenger is in the passenger's seat, and an inner panel 34 for displaying a variety of information.

Figure 2:
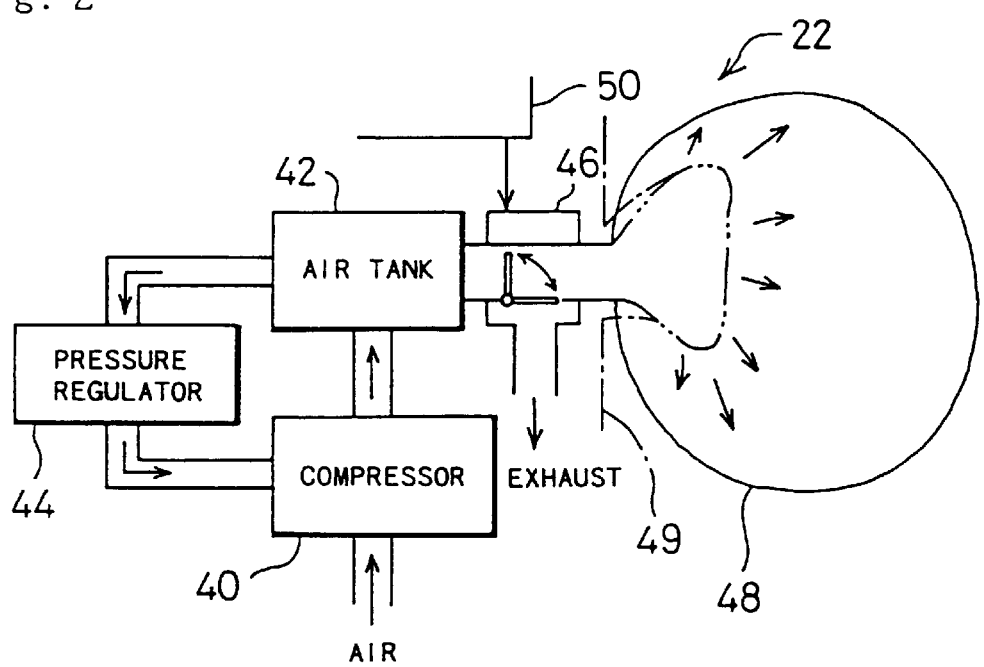
FIG. 2 schematically illustrates structure of an attitude-sustaining air bag 22.

The configuration of the attitude-sustaining air bag 22 is illustrated in FIG. 2. The attitude-sustaining air bag 22 includes a compressor 40 for ingesting the air from the atmosphere and compressing the ingested air, an air tank 42 for reserving the air compressed by the compressor 40, and a pressure regulator 44 for outputting a control pressure to the compressor 40 in order to maintain the pressure in the air tank 42 at a fixed level. The attitude-sustaining air bag 22 further includes a high-speed control valve 46 for controlling the flow of the pressurized air based on an instruction given by a control unit 50 (described later), and an air bag body 48 inflated and expanded with the pressurized air. While the vehicle is in a driving state, the attitude-sustaining air bag 22 stores the high-pressure air compressed by the compressor 40 in the air tank 42 thereof. When the control unit 50 gives an instruction to sustain the attitude, the high-speed control valve 46 is switched to supply the high-pressure air in the air tank 42 to the air bag body 48 and inflate and expand the air bag body 48 with the supplied high-pressure air. When there is no necessity for supporting the attitude, the high-speed control valve 46 closes the passage of the air tank 42 and makes the high-pressure air in the air bag body 48 discharged into the atmosphere. The air bag body 48 is then abruptly contracted and accommodated in a certain place. The attitude-sustaining air bag 22 further includes an accommodation support mechanism 49, which enables the air bag body 48 to be folded and accommodated below a dash board.

The air bag body 48 in the attitude-sustaining air bag 22 is inflated and expanded to mainly support the lower half of the body of the passenger. This accordingly does not obstruct the view of a passenger in the passenger's seat.

Figure 3:
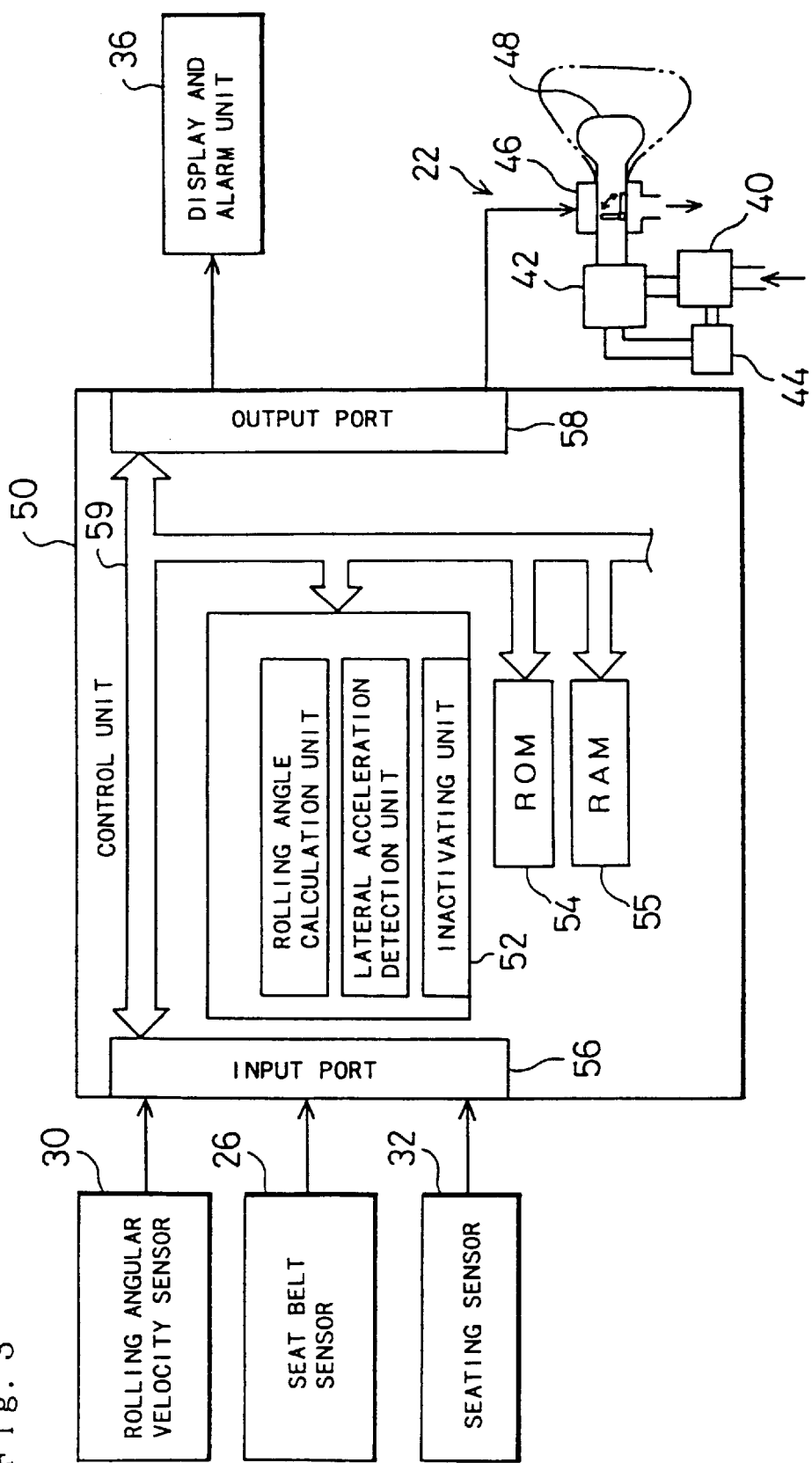
FIG. 3 is a block diagram showing structure of the attitude-supporting apparatus of the first embodiment including a control unit 50.

The following describes a control system including the control unit 50. FIG. 3 is a block diagram illustrating connection of various sensors and actuators with the control unit 50. Referring to FIG. 3, the control unit 50 includes known elements, that is, a CPU 52, a ROM 54, a RAM 55, an input port 56, an output port 58, and a bus 59 for connecting the respective elements with one another. The CPU 52 executes control programs stored in the ROM 54 to realize a rolling angle calculation unit for calculating a rolling angle, a lateral acceleration detection unit for detecting an acceleration in the lateral direction of the vehicle, and an inactivating unit for determining whether or not a condition for prohibiting the operation of the attitude-sustaining air bag 22 is satisfied. The processing executed by the CPU 52 will be described later.

The CPU 52 receives data from the rolling angular velocity sensor 30, the seat belt sensor 26, and the seating sensor 32 connected to the input port 56, and controls various actuators connected to the output port 58 based on the input data representing the conditions of the vehicle. In this embodiment, a display and alarm unit 36 arranged in the inner panel 34 and the high-speed control valve 46 of the attitude-sustaining air bag 22 are connected with the output port 58. The CPU 52 drives the display and alarm unit 36 to display an operating state or give an alarm and activates or inactivates the attitude-sustaining air bag 22, according to the results of control and requirements.

Figure 4:
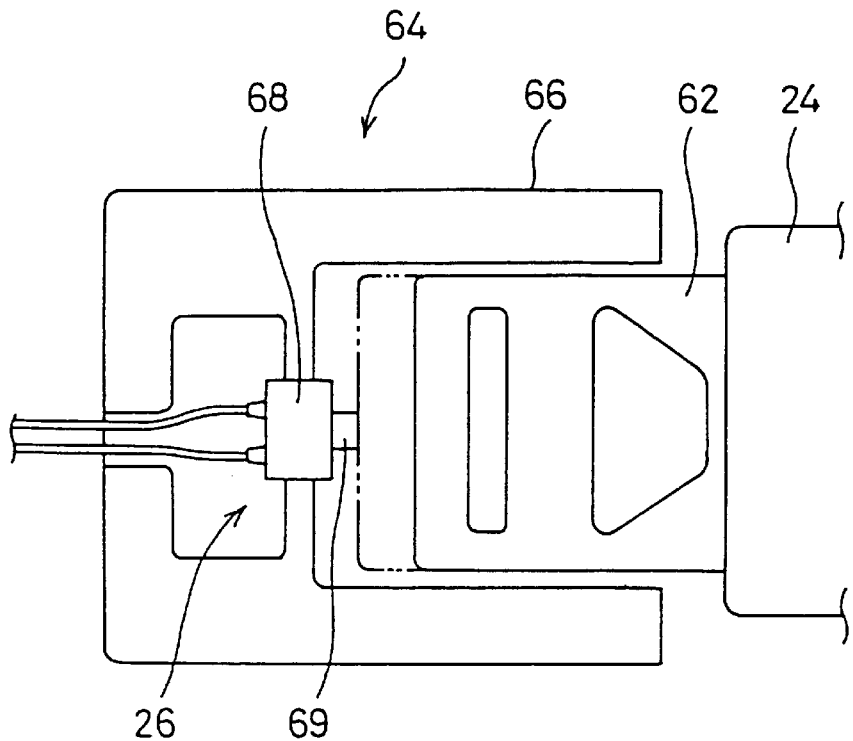
FIG. 4 shows structure of a seat belt sensor 26.

The following describes the details of various sensors connected to the input port 56. Referring to FIG. 4, the seat belt sensobelt sensor 26 includes a micro switch 68, which is arranged in a main body 66 of a catch 64 to detect that an engagement fixture 62 attached to one end of the seat belt 24 is set in the catch 64. The free end of the engagement fixture 62 presses against a notch 69 of the micro switch 68 and thereby turns on the micro switch 68. The micro switch 68 is turned on only when the passenger fastens the seat belt 24 in a normal state.

Figure 5:
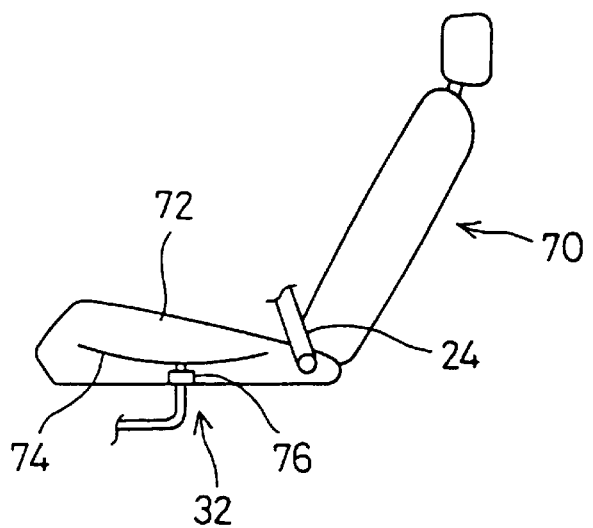
FIG. 5 shows an arrangement of a seating sensor 32.

Referring to FIG. 5, the seating sensor 32 is disposed below a seat cushion 72 of a passenger's seat 70. The seating sensor 32 includes a micro switch 76, which detects a movement of a bar 74 yielding when a passenger having a preset or greater weight sits on the seat cushion 72. Various sensors including a sensor utilizing an electrostatic capacity and a sensor utilizing image processing may be used for the seating sensor 32.

Figure 6:
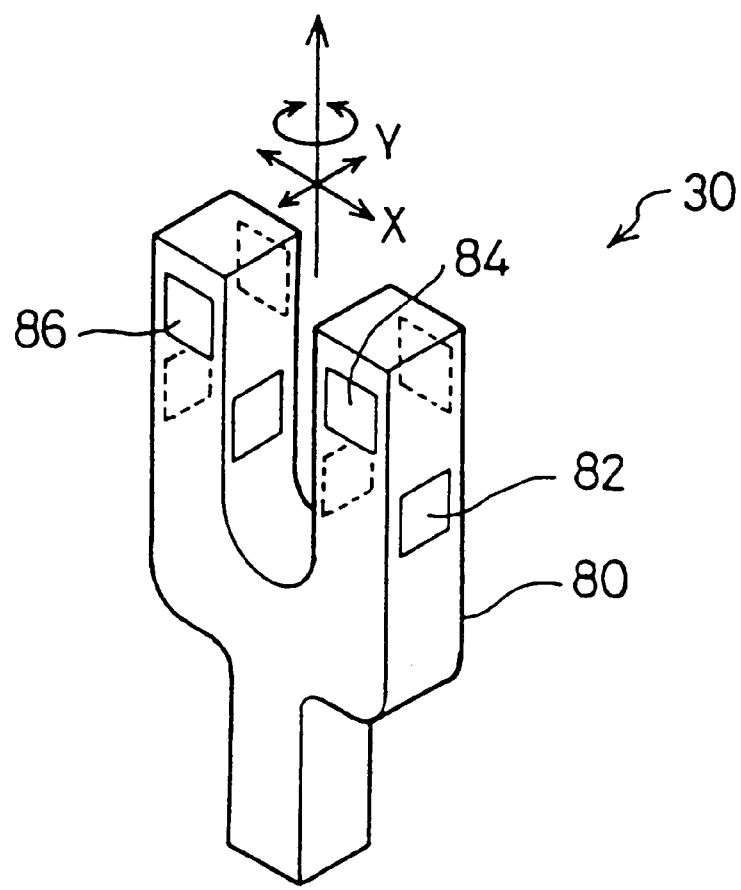
FIG. 6 schematically illustrates structure of a rolling angular velocity sensor 30.

The rolling angular velocity sensor 30 detects a roll that is a motion in the lateral direction of the vehicle. In the embodiment, a sensor utilizing the Coriolis force to detect the revolving angular velocity is used for the rolling angular velocity sensor 30. As illustrated in FIG. 6, an alternating voltage is applied to an electrode 82 attached to a side face of a fork-shaped vibrator 80, so that a vibration is applied to the vibrator 80 along an X axis. When a revolving motion around a longitudinal axis of the vehicle is applied to the vibrator 80 under such conditions, the Coriolis force acts on the vibrator 80 to induce a beating motion of the vibrator 80. Electrodes 84 and 86 attached to the respective side faces of the fork-shaped vibrator 80 detect the magnitude of the beating motion as a distortion, thereby measuring the Coriolis force or the angular velocity. The rolling angular velocity sensor 30 outputs the average of voltages, which are measured by the electrodes 84 and 86 and subsequently rectified, as a rolling rate RR to the control unit 50. An acceleration sensor for measuring a force applied to a predetermined mass according to the rotation around the longitudinal axis of the vehicle or a gas gyroscope may also be used for the rolling angular velocity sensor 30.

Figure 7:
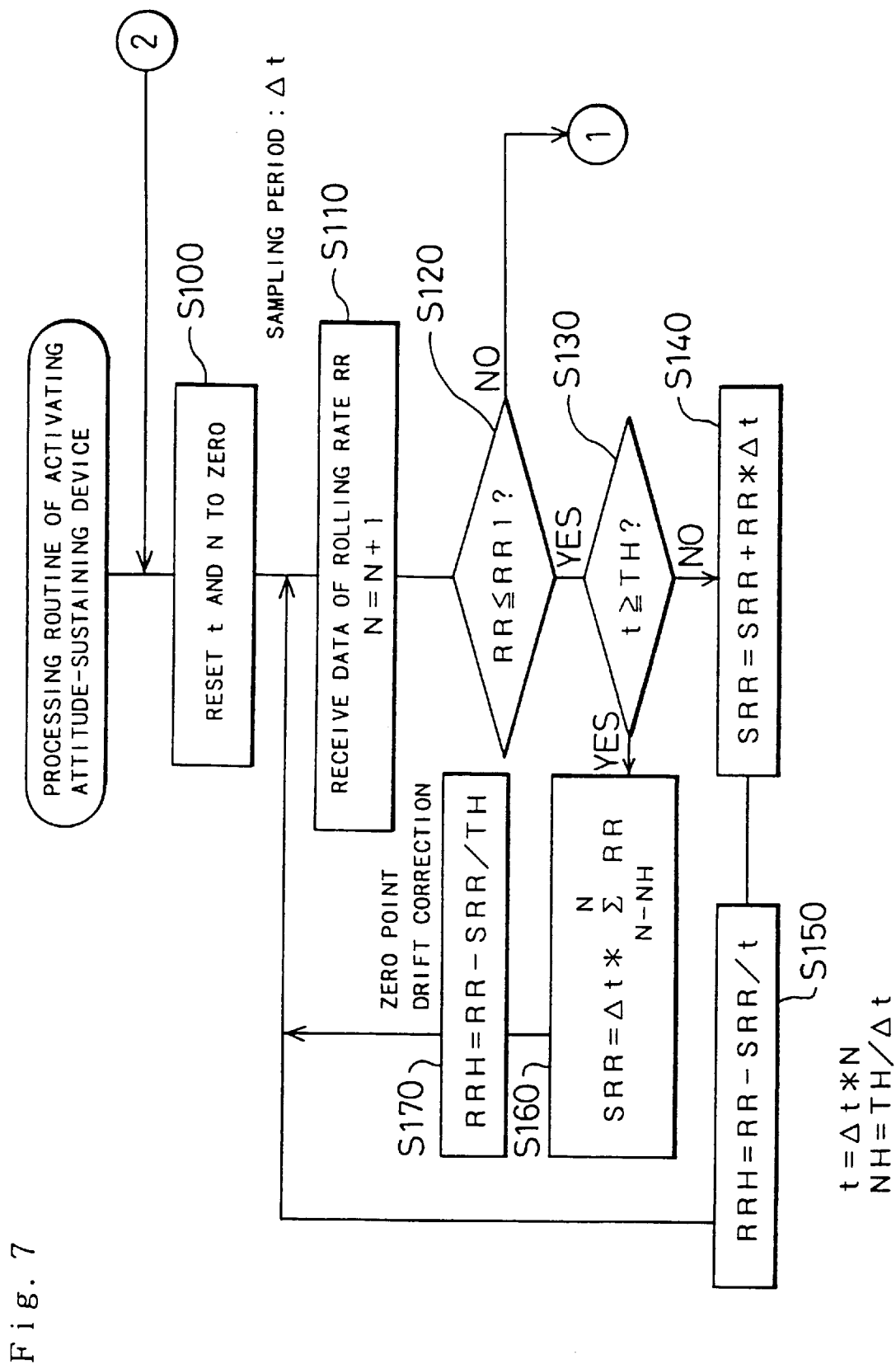
FIGS. 7 and 8 are flowcharts showing a processing routine of activating an attitude-sustaining device executed in the first embodiment.

The following describes the processing to activate the attitude-sustaining air bag 22. When the vehicle starts running, the control unit 50 executes a processing routine of activating an attitude-sustaining device shown in the flow-charts of FIGS. 7 and 8. When the program enters the processing routine, the control unit 50 first resets variables at step S100. In accordance with a concrete procedure, a variable t representing a time period elapsing since the start of the processing and a variable N representing the frequency of processing are initialized to zero at step S100. In the subsequent processing, $\Delta t$ represents a sampling period of the rolling angular velocity.

After resetting the variables, the control unit 50 reads the rolling rate RR from the rolling angular velocity sensor 30 and increments the sampling times N by the value '1' at step S110. The program then proceeds to step S120 at which the rolling rate RR input from the rolling angular velocity sensor 30 is compared with a predetermined threshold value RR1. When the input rolling rate RR is equal to or smaller than the predetermined threshold value RR1, the program determines that no significant roll requiring control of the vehicle occurs and proceeds to step S130 to carry out zero point drift correction.

The zero point drift correction is required in apparatuses that output a weak d.c. voltage. When such apparatuses are used over a long time period, the zero point of the sensor is gradually shifted with a variation in environmental temperature or by the accumulated noise. The zero point drift correction corrects such a shift. At step S130, the time period t elapsing since the start of the processing is compared with a predetermined time period TH. Until the time period t becomes equal to or greater than the predetermined time period TH, the control unit 50 integrates the rolling rate RR over the sampling period $\Delta t$ to update an accumulated value SRR at step S140. Namely the arithmetic operation of SRR=SRR+RR*$\Delta t$ is carried out. At subsequent step S150, the control unit 50 calculates a corrected rolling rate RRH from the accumulated value SRR. Namely the corrected rolling rate RRH is computed according to the arithmetic operation of RRH=RR−SRR/t. The division of the accumulated value SRR by the elapsing time t gives the mean rolling rate in the predetermined time period. The difference between the latest rolling rate RR and the mean rolling rate gives the corrected rolling rate RRH. The value obtained by dividing the accumulated value SRR by the elapsing time t corresponds to the zero point after the drift correction. The arithmetic value RRH accordingly represents the rolling rate after the drift correction. The program then returns to step S110 to receive new data of the rolling rate RR and repeat the above procedure for the newly input rolling rate RR.

In case that the rolling rate RR is not greater than the predetermined threshold value RR1 and the elapsing time t is less than the predetermined time period TH, on the other hand, the processing of steps S110 through S150 discussed above is repeatedly executed. When the predetermined time period TH has elapsed (t≧TH) at step S130 while the rolling rate RR is still kept not greater than the threshold value RR1, the program proceeds to step S160. The control unit 50 calculates the accumulated value SRR anew from the past data of rolling rate RR collected in a predetermined time period at step S160. At subsequent step S170, the control unit 50 calculates the difference between the average, which is obtained by dividing the accumulated value SRR by the predetermined time period TH and corresponds to the zero point after the drift correction, and the rolling rate RR as the corrected rolling rate RRH. As discussed above, the corrected rolling rate RRH is calculated from all the input data before the predetermined time period TH has elapsed (steps S140 and S150). After the predetermined time period TH has elapsed, however, the corrected rolling rate RRH is calculated from a predetermined number of pieces of past data. The arithmetic operation executed at step S160 determines the number of samples NH obtained before the predetermined time period TH has elapsed (NH=TH/$\Delta t$), sums up the NH pieces of data of rolling rate RR from the (N-NH)-th rolling rate RR to the N-th rolling rate RR, and multiplies the sum of the rolling rate RR by the sampling period $\Delta t$ to yield the accumulated value SRR. The arithmetic operation executed at step S170 divides the accumulated value SRR by the predetermined time period TH, and subtracts the quotient from the rolling rate RR to yield the corrected rolling rate RRH. Since the number of data applicable to the arithmetic operations is limited in a predetermined time period from the start of the measurement, different arithmetic operations are adopted before and after the predetermined time TH to carry out the zero point drift correction and determine the corrected rolling rate RRH.

Figure 8:
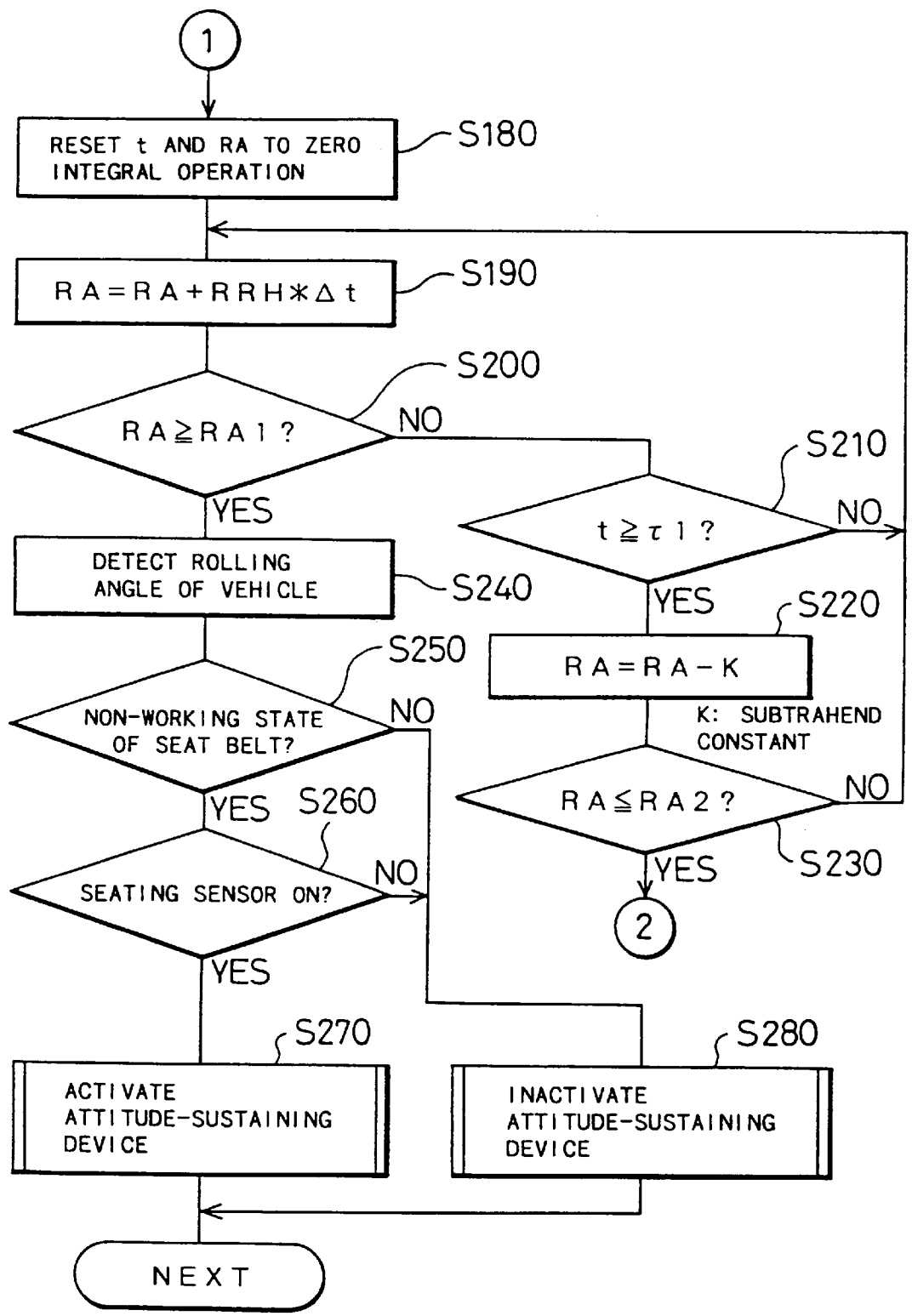

In case that the vehicle significantly turns around the longitudinal axis thereof and the rolling rate RR exceeds the predetermined threshold value RR1 at step S120 while the zero point drift correction and calculation of the corrected rolling rate RRH are carried out, the program proceeds to step S180 in the flowchart of FIG. 8. At step S180, the variable t representing the elapsing time period and a variable RA representing a rolling angle are both reset to zero. The rolling angle RA is then updated by an integral operation at step S190. Namely the arithmetic operation of RA=RA+RRH*$\Delta$t is carried out.

At subsequent step S200, the calculated rolling angle RA is compared with an upper limit value RA1. When the rolling angle RA is less than the upper limit value RA1, the program proceeds to step S210, at which the elapsing time period t is compared with a reference value $\tau$1. When the elapsing time period t is less than the reference value $\tau$1, the program returns to step S190 to repeat the updating procedure of the rolling angle RA (the processing of steps S190 through S210). In case that a severe roll of the vehicle subsides after giving a large rolling rate at step S120, the reference time period $\tau$1 elapses while the calculated rolling angle RA is kept less than the upper limit value RA1. Under such conditions, the program determines that the rolling angle RA is being gradually returned to a normal level and proceeds to step S220 to subtract a subtrahend constant K from the rolling angle RA and decrease the rolling angle RA little by little. At subsequent step S230, it is determined whether or not the rolling angle RA becomes equal to or less than a lower limit value RA2. The above procedure is repeated while the rolling angle RA is greater than the lower limit value RA2. When the rolling angle RA becomes not greater than the lower limit value RA2, the program returns to step S100 in the flowchart of FIG. 7 and repeats the processing discussed above.

When a large rolling rate is detected at step S120 and the calculated rolling angle RA becomes equal to or greater than the upper limit value RA1 at step S200, the program determines that the rolling angle of the vehicle reaches a predetermined level at step S240 and proceeds to the subsequent steps to determine whether or not the attitude-sustaining device is to be activated. The control unit 50 determines whether or not the seat belt 24 is fastened at step S250 based on the state of the seat belt sensor 26, and then determines whether or not a passenger sits on the passenger's seat 70 at step S260 based on the on-off condition of the seating sensor 32. When the seat belt sensor 26 shows a non-working state of the seat belt 24 and the seating sensor 32 shows a seating state, the program goes to step S270 to activate the attitude-sustaining device. When the seat belt sensor 26 shows a working state of the seat belt 24 or the seating sensor 32 shows a non-seating state, the program goes to step S280 either to keep the non-active state of the attitude-sustaining device or to inactivate the working attitude-sustaining device.

In this embodiment, the attitude-sustaining device is the attitude-sustaining air bag 22. In order to activate the attitude-sustaining air bag 22, the control unit 50 outputs a signal of valve-opening instruction to the high-speed control valve 46 via the output port 58 and opens the high-speed control valve 46 to feed the high-pressure air stored in the air tank 42 to the air bag body 48. The air bag body 48 is then abruptly inflated and expanded to a fixed shape, so as to hold the lower half of the body of the passenger steady in the passenger's seat 70. In case that the vehicle rolls at a predetermined or greater rolling rate and the rolling angle RA becomes equal to or greater than the upper limit value RA1 to apply a lateral force to the passenger, the inflated air bag body 48 sustains the attitude of the passenger. The attitude-sustaining function of the air bag body 48 supports the attitude-sustaining action of the passenger, such as concentration of a force on the upper half of the body, against a roll of the vehicle. When the passenger fastens the seat belt 24, it is not required to inflate the air bag body 48 since the seat belt 24 securely holds the attitude of the passenger. In accordance with another possible application, however, the attitude-sustaining air bag 22 may be activated even when the passenger fastens the seat belt 24.

In this embodiment, the reversible attitude-sustaining air bag 22 is used for the attitude-sustaining device. In accordance with an alternative application, the seat belt 24 may be used as the attitude-sustaining device and fastened when the vehicle rolls at a predetermined or greater rolling rate. The air bag body 48 of the attitude-sustaining air bag 22 may have a size corresponding to the gap between the side wall of the vehicle and the passenger and be inflated and expanded from the side wall of the vehicle when the vehicle rolls at a predetermined or greater rolling rate. It is also practical to use an irreversible air bag (which is inflated with a gas evolved by an inflator like the air bag 20) according to the degree of the roll.

In the embodiment, the control is based on the rolling angle measured by the rolling angular velocity sensor 30. In accordance with another preferable application, however, the operation of the attitude-sustaining air bag 22 may be controlled, based on the lateral acceleration measured by an independent lateral acceleration sensor mounted on the vehicle. In this case, the measured value of the lateral acceleration may be used directly to determine whether or not the attitude-sustaining air bag 22 is to be activated. The derivative of the lateral acceleration or any other arithmetic value based on the lateral acceleration may be used for the determination. A value obtained from the lateral acceleration and its arithmetic value (such as the derivative) by referring to a three-dimensional map may also be used for the determination of whether or not the attitude-sustaining air bag 22 is to be activated.

Figure 9:
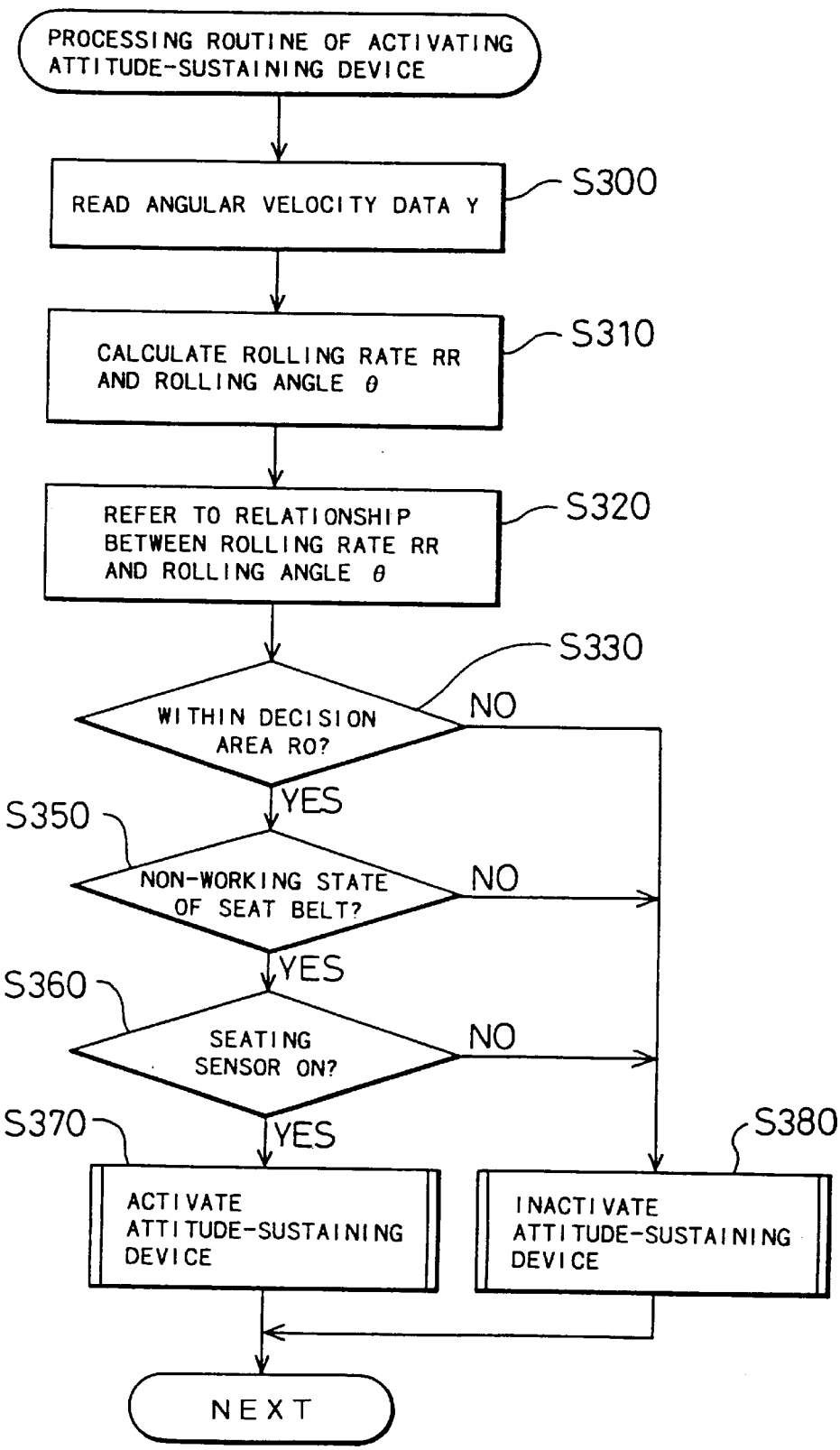
FIG. 9 is a flowchart showing a processing routine of activating an attitude-sustaining device executed in the second embodiment.

The following describes a second embodiment according to the present invention. The attitude-supporting apparatus of the second embodiment has the identical hardware structure with that of the first embodiment, but carries out different processing in its control unit 50. Namely the attitude-supporting apparatus includes the same attitude-sustaining air bag 22 and the other constituents, but the control unit 50 thereof executes a different processing routine for activating an attitude-sustaining device. FIG. 9 is a flowchart showing an essential flow of the processing routine executed by the control unit 50 for activating an attitude-sustaining device. When the program enters the routine, the control unit 50 first receives data Y of angular velocity from the rolling angular velocity sensor 30 at sampling periods $\Delta$t at step S300. A rolling rate RR and a rolling angle $\theta$ are then calculated from the data of rolling angular velocity Y at step S310.

The rolling rate RR is obtained according to the following Equation (1) as a mean value of the rolling angular velocity Y in a predetermined time period Δt (10 milliseconds in this embodiment). The rolling angle θ is obtained according to the following Equation (2) as an integral of the rolling rate RR in a predetermined time period Δt (5 seconds in this embodiment).

$$RR(t) = \frac{1}{\delta t} \int_{t-\delta t}^{t} Y(tI) d\, tI \quad (1)$$

$$\theta(t) = \int_{t-\varepsilon t}^{t} RR(tI) d\, tI \quad (2)$$

The rolling angle θ is determined not by directly integrating the rolling angular velocity Y but by integrating the rolling rate RR. This is because the signals output from the rolling angular velocity sensor 30 include high-frequency components, which are to be eliminated. The calculation of the rolling rate RR yields a mean value in the period of 10 milliseconds. This process functions as a soft filter for cutting the high-frequency components, and the rolling angle θ is accordingly calculated from the rolling rate RR in this embodiment. In case that the outputs of the rolling angular velocity sensor 30 do not include the non-required high-frequency components, the angular velocity signals Y output from the rolling angular velocity sensor 30 may be integrated directly. In the digital processing, when RR1 denotes the current measurement value, the rolling angle θ can also be expressed as Equation (3) given below using n1 values sampled from the n1 times before to the current time:

$$\theta n = \sum_{i=n-nI+1}^{n} RRi \quad (3)$$

Figure 10:
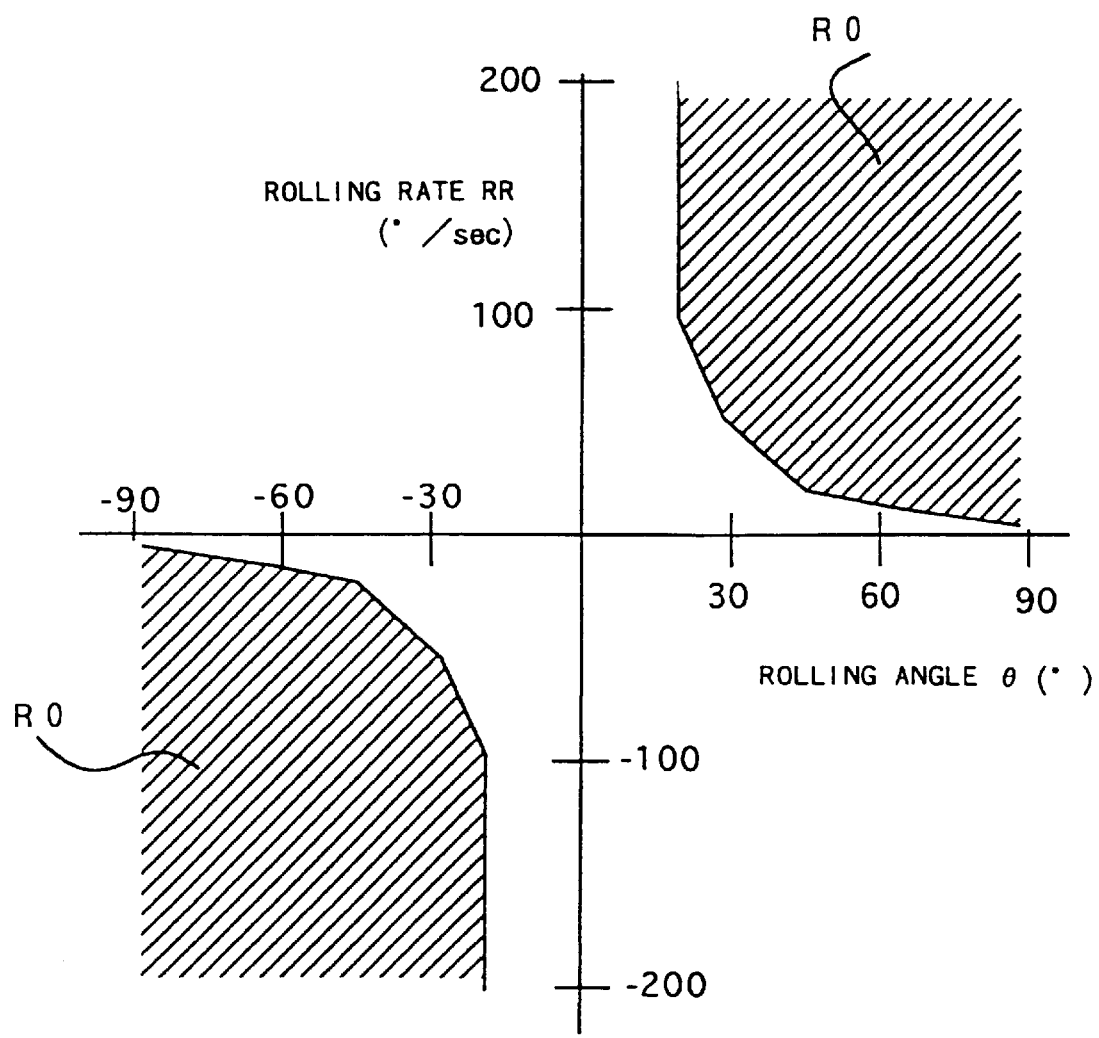
FIG. 10 is a graph showing a decision area RO of the rolling rate RR and the rolling angle θ, in which the attitude-sustaining device is to be activated.

The control unit 50 subsequently refers to the relationship between the rolling rate RR and the rolling angle θ at step S320, and determines whether RR and the rolling date RR and the rolling angle θ are within a decision area RO shown in FIG. 10 at step S330. The map of FIG. 10 is stored into the ROM 54 in advance. When the rolling state of the vehicle is determined to be within the decision area RO, in the same manner as the first embodiment, the control unit 50 determines whether or not the seat belt 24 is fastened at step S350, and then determines whether or not the seating sensor 32 is in ON position, that is, whether or not a passenger sits on the passenger's seat 70, at step S360. Only when the seat belt sensor 26 shows a non-working state of the seat belt 24 and the seating sensor 32 is in ON position, the program goes to step S370 to activate the attitude-sustaining device, that is, the attitude-sustaining air bag 22 in this embodiment. When the relationship between the rolling rate RR and the rolling angle θ is determined not to be within the decision area RO at step S330 or when either the seat belt sensor 26 shows a working state of the seat belt 24 or the seating sensor 32 is in OFF position while the relationship is within the decision area RO, on the contrary, the program goes to step S380 either to keep the non-active state of the attitude-sustaining device (attitude-sustaining air bag 22 in this embodiment) or to inactivate the working attitude-sustaining device.

As discussed above, the structure of the second embodiment does not determine the activation of the attitude-sustaining device, that is, the attitude-sustaining air bag 22, simply based on the rolling rate RR, but activates the attitude-sustaining air bag 22 to support the attitude of the passenger, in response to the large rolling angle θ even when the rolling rate RR is relatively low. In this embodiment, the decision area RO, in which the attitude-sustaining device should be activated, is set, based on the relationship between the rolling rate RR and the rolling angle θ. The decision area can thus be adequately set according to the actual characteristics of the vehicle. By way of example, when the attitude-supporting apparatus of the embodiment is applied to the passenger's seat, the conditions for activating the attitude-sustaining device are varied according to the direction of the rolling force applied to the passenger who is sitting on the passenger's seat, that is, either the upward direction or the downward direction. This structure allows the attitude of the passenger to be supported and sustained at a higher efficiency. The determination of whether or not the attitude-sustaining device is to be activated can be changed, based on the past data of the rolling rate and the rolling angular velocity for a short time period.

Figure 11:
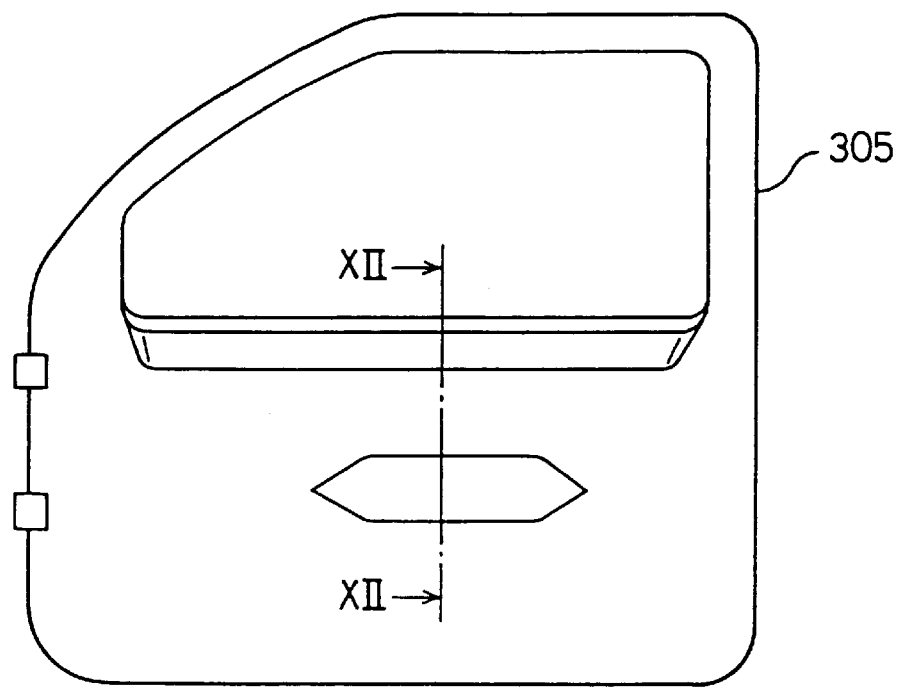
FIG. 11 is a plan view illustrating a door of a vehicle as a third embodiment according to the present invention.
Figure 12:
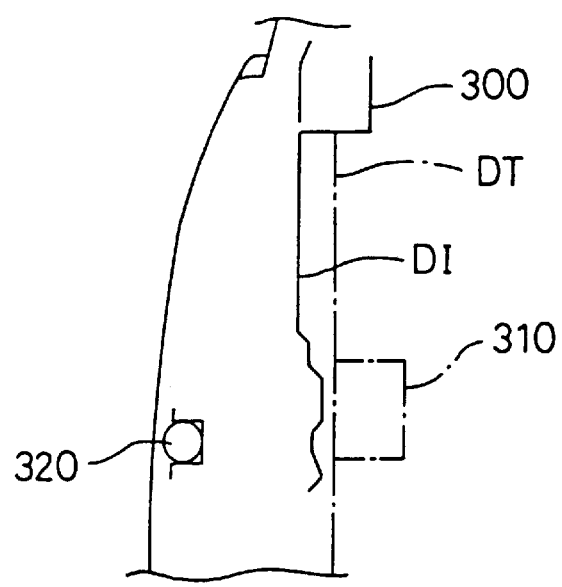
FIG. 12 is a cross-sectional view taken on the line XII—XII of FIG. 11.

Another preferable mode of carrying out the present invention is described as a second embodiment. FIG. 11 is a plan view showing a front door 305 of a vehicle, and FIG. 12 is a cross-sectional view taken on the line XII—XII of FIG. 11. Referring to FIGS. 11 and 12, there is a rise formed as an arm rest 310 on the lower portion of the front door 305. The arm rest 310 is supported by an inner steel plate DI of the door 305 and protruded by approximately 50 mm from an outer contour DT of the door 305 to the inside of the vehicle. A restriction member 300 is further disposed above the arm rest 310 and directly fixed to the inner steel plate DI. The door 305 is reinforced by a reinforcing bar 320.

Figure 13:
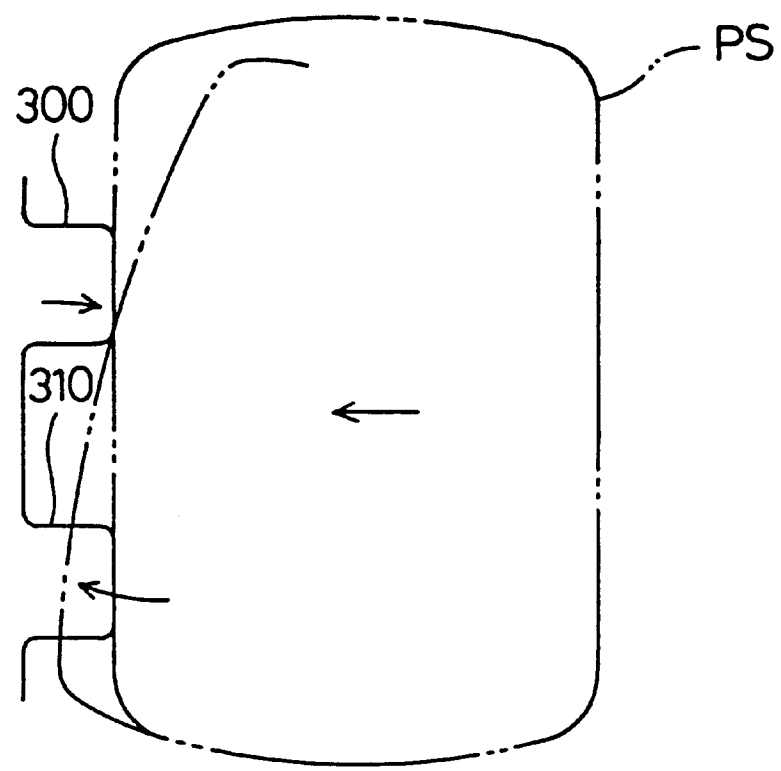
FIG. 13 shows the principle of attitude-sustaining function in the third embodiment.

While the restriction member 300 is directly fixed to the inner steel plate DI, the arm rest 310 is fixed to the outer contour DT of the door 305 and only indirectly supported by the inner steel plate DI. In case that equivalent forces are applied to the restriction member 300 and the arm rest 310 simultaneously, the arm rest 310 is deformed significantly whereas the restriction member 300 is hardly deformed. As shown in FIG. 13, the deformation of the arm rest 310 enables a lower portion of an object PS to be pressed against the inner wall of the door at a greater degree. This effectively prevents a force applied to the object PS by a turn or a roll of the vehicle from acting above the center of gravity. The object PS is accordingly kept relatively stable. This structure securely holds the upper portion of the object, that is, steadily sustains the attitude of the upper half of the body of the passenger.

The structure of the second embodiment may be carried out separately from or together with the attitude-sustaining air bag 22 of the first embodiment. The application of both the structures further enhances the attitude-sustaining function. The structure of the second embodiment may alternatively be combined with another attitude-sustaining device. The arm rest 310 may be omitted according to the requirements. In accordance with another possible application, the restriction member 300 may not be protruded from the outer contour of the door but be level with the outer contour. A plurality of members may further be arranged laterally between the restriction member 300 and the arm rest 310 to give a greater rigidity to its upper side. The inner wall of the door may be constructed to give a greater rigidity and a smaller degree of deformation to its upper portion.

The present invention is not restricted to the above embodiments or applications, but there may be many modifications, changes, and alterations without departing from the scope and the spirit of the main characteristics of the present invention.

It should be clearly understood that the embodiments discussed above are only illustrative and not restrictive in any sense. The scope and spirit of the present invention are limited only by the terms of the appended claims.

What is claimed is:

1. An attitude-supporting apparatus mounted on a vehicle for sustaining an attitude of a passenger, said apparatus comprising:

rolling rate detection means that measures a rolling rate, which is a revolving angular velocity around a longitudinal axis of said vehicle;

rolling angle detection means that measures a rolling angle of said vehicle; and attitude-sustaining device activating means that activates an attitude-sustaining device for sustaining said attitude of said passenger, based on said measured rolling rate and said measured rolling angle.

2. An attitude-supporting apparatus in accordance with claim 1, wherein said rolling angle detection means measures the rolling angle when the rolling rate of the vehicle is not less than a predetermined level, and said attitude-sustaining device activating means activates said attitude-sustaining device, based on magnitude of the rolling angle when the rolling rate of the vehicle is not less than the predetermined level.

3. An attitude-supporting apparatus in accordance with claim 1, wherein said attitude-sustaining device activating means activating said attitude-sustaining device based on a relationship between said rolling rate and said rolling angle.

4. An attitude-supporting apparatus in accordance with claim 1, said apparatus further comprising:

restraint working condition detecting means for detecting a working condition of a passive restraint for holding said passenger steady in a seat; and inactivating means for prohibiting operation of said attitude-sustaining device activating means when the result of detection by said restraint working condition detecting means shows that said passive restraint is in an active state.

5. An attitude-supporting apparatus in accordance with claim 1, said apparatus further comprising:

seating condition detecting means for determining whether or not said passenger is seated; and inactivating means for prohibiting operation of said attitude-sustaining device activating means when the result of detection by said seating condition detecting means shows that said passenger is not seated.

6. An attitude-supporting apparatus in accordance with claim 1, wherein said attitude-sustaining device comprises and air bag.

7. An attitude-supporting apparatus in accordance with claim 1, said apparatus further comprising a restriction member disposed on a side wall member of said vehicle to be located in a vicinity of said passenger for restricting a movement of said passenger in a direction towards said side wall member.

8. An attitude-supporting apparatus in accordance with claim 7, wherein said restriction member comprises an upper portion and a lower portion, said lower portion being deformed to a relatively greater extent than said upper portion when a force is applied from the inside of said vehicle towards said side wall member.

9. An attitude-supporting apparatus in accordance with claim 8, wherein said restriction member comprises a plurality of component members arranged in a substantially horizontal direction inside said side wall member, upper component members having a greater rigidity than that of lower component members.

10. An attitude-supporting apparatus in accordance with claim 9, wherein at least one of said lower component members is configured to an armrest.

11. A method of sustaining an attitude of a passenger in a vehicle, said method comprising the steps of:

providing an attitude-sustaining device for sustaining said attitude of said passenger seated in said vehicle;

measuring a rolling rate that is a revolving angular velocity around a longitudinal axis of said vehicle;

measuring a rolling angle of said vehicle;

determining whether a condition for activating said attitude-sustaining device is satisfied, based on the measured rolling rate and the measured rolling angle; and activating said attitude-sustaining device when said condition is fulfilled.

* * * * *

UNITED STATES PATENT AND TRADEMARK OFFICE
CERTIFICATE OF CORRECTION

PATENT NO. : 5,925,084
DATED : 20 July 1999
INVENTOR(S) : Kazuhiko GOTOH et al.

It is certified that error appears in the above-identified patent and that said Letters Patent is hereby corrected as shown below:

| Column | Line | |
|---|---|---|
| 1 | 8 | Change "related" to --relates--. |
| 1 | 19 | Delete entire line. |
| 1 | 20 | Delete "increase from the viewpoint of the passenger protection." and insert therefor --Recently, passenger protection in vehicles which carry the air-bag has been improved.-- |
| 5 | 18 | Delete "sensobelt". |
| 9 | 27 | Change "RR1" to --RRi--. |
| 9 | 38 | Delete "RR and" and insert --both--; change "date" to ---rate--. |

UNITED STATES PATENT AND TRADEMARK OFFICE
CERTIFICATE OF CORRECTION

PATENT NO. : 5,925,084
DATED : 20 July 1999
INVENTOR(S) : Kazuhiko GOTOH et al.

It is certified that error appears in the above-identified patent and that said Letters Patent is hereby corrected as shown below:

| Column | Line | |
|--------|------|---|
| 11 | 29 | After "device" insert --is--. |
| 12 | 7 | Change "and air bag" to --an air bag--. |

Signed and Sealed this

Twenty-seventh Day of June, 2000

Attest:

Q. TODD DICKINSON

Attesting Officer

Director of Patents and Trademarks